United States Patent [19]

Koseki et al.

[11] Patent Number: 4,686,668
[45] Date of Patent: Aug. 11, 1987

[54] LOOPBACK OF A PCM SIGNAL WITH LOOPBACK COMMAND SIGNAL BITS PLACED IN EACH FRAME OF THE SIGNAL AS PREDETERMINED ONES OF OVERHEAD BITS

[75] Inventors: Toshikazu Koseki; Shigeaki Saito, both of Tokyo, Japan

[73] Assignee: NEC Corporation, Tokyo, Japan

[21] Appl. No.: 730,900

[22] Filed: May 6, 1985

[30] Foreign Application Priority Data

May 8, 1984 [JP] Japan ..................... 57-90126

[51] Int. Cl.$^4$ .............................. H04J 1/16
[52] U.S. Cl. ......................... 370/15; 370/16
[58] Field of Search ..................... 370/15, 16; 179/175.31 R; 371/22

[56] References Cited

U.S. PATENT DOCUMENTS

| | | | |
|---|---|---|---|
| 4,006,320 | 2/1977 | Markl | 370/15 |
| 4,271,513 | 6/1981 | Maejima et al. | 370/15 |
| 4,402,075 | 8/1983 | Bargeton et al. | 370/15 |
| 4,435,704 | 3/1984 | Hashimoto | 370/15 |
| 4,564,933 | 1/1986 | Hirst | 370/15 |

Primary Examiner—Douglas W. Olms
Assistant Examiner—Curtis Kuntz
Attorney, Agent, or Firm—Sughrue, Mion, Zinn, Macpeak & Seas

[57] ABSTRACT

A first terminal station (11) comprises a loopback signal producing circuit (L1~L5) for producing a loopback command signal having a predetermined number of command bits in each frame of a first PCM signal, and a signal multiplexing circuit (42) for multiplexing input signals and overhead bits into successive frames of the PCM signal with the command bits used as predetermined ones of the overhead bits. The command bits indicate a repeater station (21) which should loop back the PCM signal and a second terminal station (12) which should not loop back the PCM signal. The repeater station comprises a signal detector (45) for detecting the command bits indicative of loopback of the PCM signal at the repeater station to produce a loopback control signal, and a loopback carrying out device (63) responsive to the loopback control signal for looping back the PCM signal. The first terminal station further comprises a signal detector (65) for detecting like command bits indicative of loopback of a second PCM signal at the first terminal station to produce a terminal loopback control signal, and a loopback carrying out device (43) responsive to the terminal loopback control signal for looping back the second PCM signal as at least a part of the first PCM signal.

5 Claims, 12 Drawing Figures

FIG 5(b)

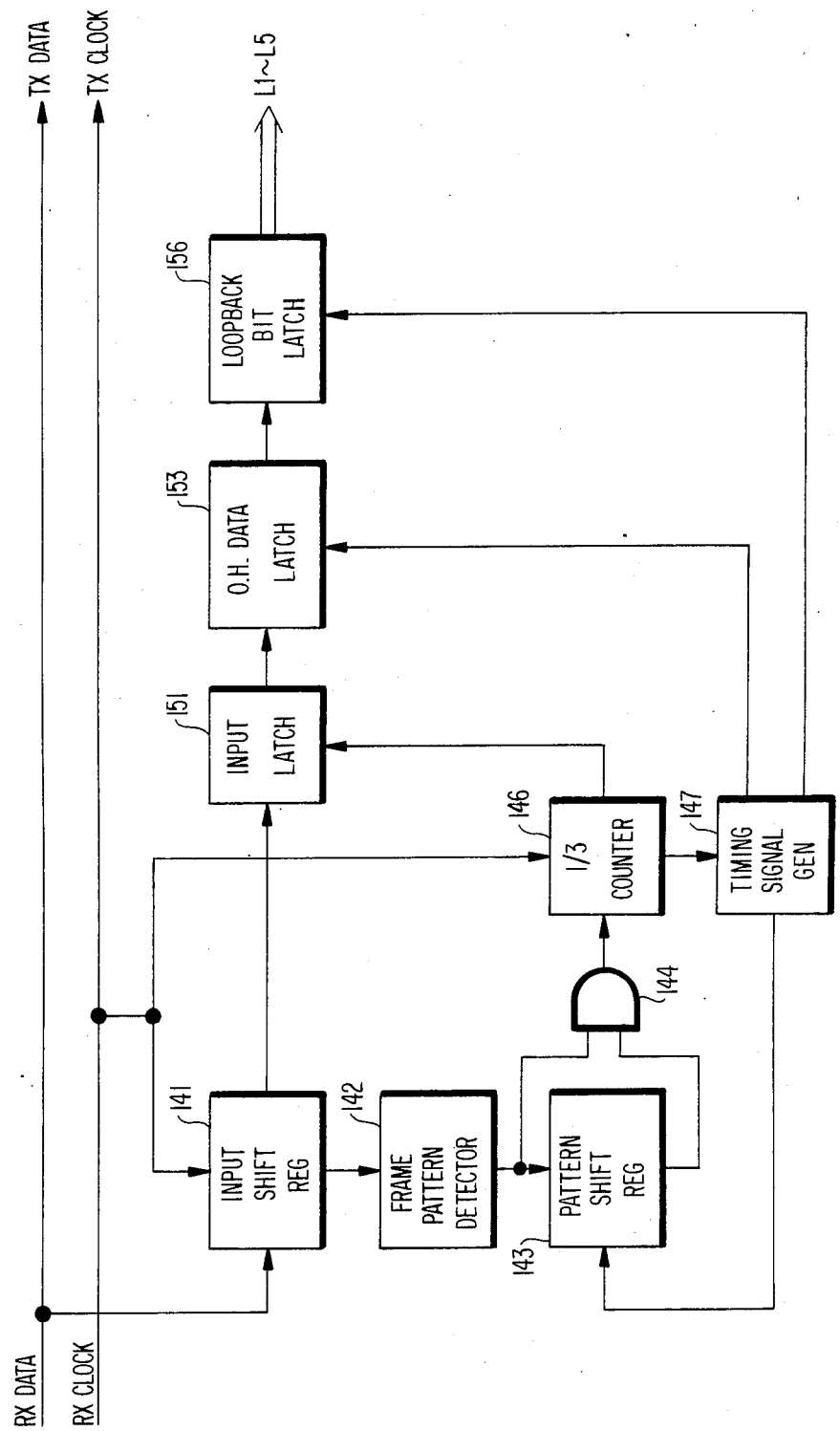

LOOPBACK OF A PCM SIGNAL WITH LOOPBACK COMMAND SIGNAL BITS PLACED IN EACH FRAME OF THE SIGNAL AS PREDETERMINED ONES OF OVERHEAD BITS

BACKGROUND OF THE INVENTION

This invention relates to a loopback command arrangement for use either in a line terminating station of a PCM (pulse code modulation) communication network or system or in an intermediate repeater station thereof and to a loopback command system for use in a PCM communication network.

Ordinarily, a PCM communication network comprises a first and a second transmission route and a first line terminating station, a plurality of intermediate repeater stations, and a second line terminating station successively along the first and the second transmission routes. In other words, the PCM communication network is a two-way communication network. The first and the second line terminating stations are usually similar in structure. When attention is directed to one of the first and the second line terminating stations, the other is a counterpart line terminating station. It is ordinary that each intermediate repeater station is a nonattendant station.

By way of example, the first line terminating station comprises a frame processing arrangement for multiplexing input signals and transmission overhead or housekeeping bits or data into successive frames of a first PCM (pulse code modulated) signal for delivery or transmission to the first transmission route. The transmission overhead bits include bits which carry a frame alignment or synchronizing signal. The frame processing arrangement demultiplexes successive frames of a second PCM signal received from the second transmission route into output signals and reception overhead bits. In an ordinary state or mode of operation of the PCM communication network, the output signals are reproductions of input signals which are multiplexed in the second PCM signal at the second line terminating station. The reception overhead bits are reproductions of transmission overhead bits which are likewise multiplexed. In the manner known in the art, the reception overhead bits need not be produced from the frame processing arrangement.

A loopback command system is useful in such a PCM communication network in locating a trouble that may take place in one of the first and the second transmission routes and the counterpart line terminating and the intermediate repeater stations. Various loopback command systems are already known.

Briefly according to U.S. Pat. No. 3,692,964 issued to Roberto Camiciottoli et al and assigned to Societa Italiana Telecommunicazioni S. p. A., a loopback command system comprises in the first line terminating station a pulse generating arrangement for supplying the first transmission route with a sequence of iteratively selected ones of different identification codes assigned to the respective intermediate repeater stations. Each intermediate repeater station comprises a detector for detecting the identification code assigned thereto to produce a detection signal and a switch responsive to the detection signal for looping the code sequence back to the first line terminating station.

Roughly according to U.S. Pat. No. 4,319,080 issued to Kiyoshi Kuwahara and assigned to Anritsu Electric Company Limited of Tokyo, Japan, supervisory frequencies are allotted to the intermediate repeater and the second line terminating stations, respectively. The first line terminating station supplies the first transmission route with a test signal consisting of those successively generated pulse train groups each of which contains a frequency component equal to one of the supervisory frequencies. Each of the intermediate repeater and the second line terminating stations comprises a band-pass filter for the supervisory frequency assigned thereto for looping the test signal back to the first line terminating station.

In such conventional loopback command systems, it is necessary on testing the trouble to make the first line terminating station suspend delivery of the first PCM signal and send instead a test signal. The test signal may be the identification code sequence.

SUMMARY OF THE INVENTION

It is therefore an object of the present invention to provide a loopback command arrangement or system for use in a PCM communication network, which arrangement or system need not suspend delivery of a PCM signal on testing the communication network.

According to an aspect of this invention, there is provided a loopback command arrangement for use in a first line terminating station of a pulse code modulation communication network comprising a first and a second transmission route and at least one intermediate repeater station and a second line terminating station along the first and the second transmission routes wherein the first line terminating station includes frame processing means for multiplexing input signals and transmission overhead bits into successive frames of a first pulse code modulated signal for delivery to the first transmission route and for demultiplexing successive frames of a second pulse code modulated signal received from the second transmission route into output signals and reception overhead bits and wherein the loopback command arrangement is characterised by signal producing means for producing a loopback command signal having a predetermined number of loopback command signal bits for each frame of the first pulse code modulated signal to indicate the at least one intermediate repeater and station which should loop back the first pulse code modulated signal as at least a part of the second pulse code modulated signal and the second line terminating station which should not loop back said first pulse code modulated signal, not signal multiplexing means for making the frame processing means multiplex the loopback command signal in the successive frames of the first pulse code modulated signal with the loopback command signal bits placed in each frame of the first pulse code modulated signal as predetermined ones of the transmission overhead bits.

According to another aspect of this invention, there is provided a loopback command arrangement for use in each of at least one intermediate repeater station of a pulse code modulation communication network comprising a first and a second line terminating station and a first and a second transmission route connecting the first and the second line terminating stations through the at least one intermediate repeater station wherein the first line terminating station comprises frame processing means for multiplexing input signals and transmission overhead bits into successive frame of a first pulse code modulated signal for delivery to the first transmission route with a predetermined number of loopback command signal bits of a loopback command signal placed in each frame of the first pulse code modulated signal as predetermined ones of the transmission overhead bits and for demultiplexing successive frames of a second pulse code modulated signal received from the second transmission route into output signals and reception overhead bits and wherein the loopback command signal bits are indicative of the at least one intermediate repeater station which should loop back the first pulse code modulated signal as at least a part of the second pulse code modulated signal and the second line terminating station which should not loop back the first pulse code modulated signal. The loopback command arrangement is characterised by: signal detecting means responsive to the successive frames of the first pulse code modulated signal for detecting the loopback command signal bits indicative of loopback of the first pulse code modulated signal at the above-mentioned each of the at least one intermediate repeater station to produce a loopback control signal; and loopback means responsive to the loopback control signal for looping back the first pulse code modulated signal as the afore-mentioned at least a part of the second pulse code modulated signal.

According to still another aspect of this invention, there is provided a loopback command system for use in a pulse code modulation communication network comprising a first and a second transmission route and a first line terminating station, at least one intermediate repeater station, and a second line terminating station along the first and the second transmission routes wherein the first line terminating station includes frame processing means for multiplexing input signals and transmission overhead bits into successive frames of a first pulse code modulated signal for delivery to the first transmission route and for demultiplexing successive frames of a second pulse code modulated signal received from the second transmission route into output signals and reception overhead bits and wherein the first line terminating station comprises; signal producing means for producing a loopback command signal having a predetermined number of loopback command signal bits for each frame of the first pulse code modulated signal to indicate the at least one intermediate repeater and station which should loop back the first pulse code modulated signal as at least a part of the second pulse code modulated signal and the second line terminating station which should not loop back the first pulse code modulated signal; and signal multiplexing means for making the frame processing means multiplex the loopback command signal in the successive frames of the first pulse code modulated signal with the loopback command signal bits placed in each frame of the first pulse code modulated signal as predetermined ones of the transmission overhead bits; each of the at least one intermediate repeater station comprising: signal detecting means responsive to the successive frames of the first pulse code modulated signal for detecting the loopback command signal bits indicative of loopback of the first pulse code modulated signal at the above-mentioned each of the at least one intermediate repeater station to produce a loopback control signal; and loopback means responsive to the loopback control signal for looping back the first pulse code modulated signal as the afore-mentioned at least a part of the second pulse code modulated signal.

BRIEF DESCRIPTION OF THE DRAWING

FIG. 8 is a block diagram of a synchronizer which may be used in an intermediate repeater equipment of the network illustrated in FIGS. 4 (a) and (b).

DESCRIPTION OF THE PREFERRED EMBODIMENTS

Figure 1:
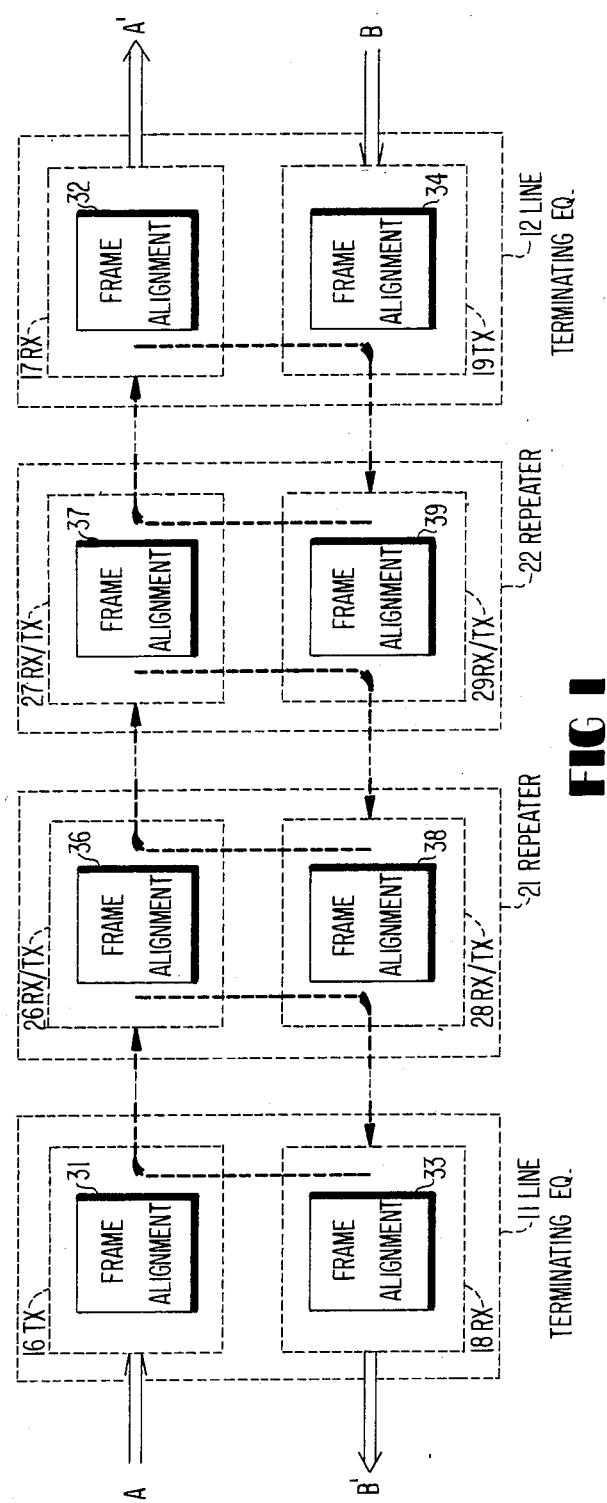
FIG. 1 is a block diagram of a PCM communication network which comprises a loopback command system according to a first embodiment of the instant invention.

Referring to FIG. 1, a PCM (pulse code modulation) communication network will be described. The PCM communication network comprises a loopback command arrangement and a loopback command system according to a first embodiment of the present invention.

The PCM communication network comprises first and second line terminating equipments 11 and 12. In the example being illustrated, the first and the second line terminating equipments 11 and 12 are at both ends of the communication network. It will be assumed merely for convenience of description that the first and the second line terminating equipments 11 and 12 are at a western and an eastern end of the communication network. Therefore, the first and the second line terminating equipments 11 and 12 will alternatively be called a western and an eastern line terminating equipment. One of the line terminating equipments 11 and 12 to which attention is directed, will be named a local line terminating equipment. The other line terminating equipment will be referred to in this event as a counterpart or remote line terminating equipment.

The western and the eastern line terminating equipments 11 and 12 comprise a western transmitter 16 and an eastern receiver 17, respectively, and a western receiver 18 and an eastern transmitter 19. In the manner which will presently become clear, the eastern and the western receivers 17 and 18 may be referred to alternatively as eastern eastward and western westward transmitters, respectively. Under the circumstances, the western and the eastern transmitters 17 and 19 may be called western eastward and eastern westward transmitters, respectively.

First and second intermediate repeater equipments 21 and 22 are interposed between the western and the eastern line terminating equipments 11 and 12 nearer thereto, respectively. The first and the second intermediate repeater equipments 21 and 22 comprise first and second eastward receiver/transmitters 26 and 27 and first and second westward receiver/transmitters 28 and 29. The receiver/transmitters 26 through 29 will be referred to simply as transmitters. The communication network may comprise either only one intermediate repeater equipment or more than two intermediate repeater equipments.

It may be mentioned here that the line terminating and the intermediate repeater equipments 11, 12, 21, and 22 are installed in terminal and repeater stations. The equipments may therefore be called terminal or line terminating stations 11 and 12 and (intermediate) repeater stations 21 and 22.

The eastward transmitters 16, 27, 26, and 17 are connected to eastward transmission channels or routes which may collectively be called an eastward transmission route or line. Similarly, the westward transmitters 19, 29, 28, and 18 are connected through a westward transmission route.

The western and the eastern eastward transmitters 16 and 17 include western and eastern eastward frame alignment circuits 31 and 32. Likewise, western and eastern westward frame alignment circuits 33 and 34 are included in the western and the eastern westward transmitters 18 and 19. First and second eastward frame alignment circuits 36 and 37 are included in the first and the second eastward transmitters 26 and 27. First and second westward frame alignment circuits 38 and 39 are included in the first and the second westward transmitters 28 and 29. For the reason which will shortly become clear, the frame alignment circuits 31 through 34 of the line terminating equipments 11 and 12 are alternatively referred to herein as frame processors.

It is known in the art that western and eastern groups of information sources and sinks (not shown) are connected to the western and the eastern line terminating equipments 11 and 12, respectively. Each information source is capable of sending an input information or message signal to a relevant one of the line terminating equipments 11 and 12. Each information sink receives an output information signal from a pertinent one of the line terminating equipments 11 and 12. The information source and sink may be a concentrator and a distributor. It will be presumed merely for brevity of description that the information sources of the western group are sending such input information signals collectively as an eastward input information signal A although it is unnecessary that all information sources of the western group be positioned westwardly of the western line terminating equipment. The information sinks of the eastern group receive such output information signals collectively as an eastward output information signal A'.

In the manner which is also known in the art and will be described more in detail as the description proceeds, the western eastward frame alignment circuit 31 multiplexes the eastward input information signal A and transmission overhead or houskeeping bits into successive frames of an eastward PCM signal for delivery to the eastward transmission route. The input information signal A is carried by input information bits. Some of the transmission overhead bits carry a frame alignment or synchronizing signal. The eastward PCM signal is propagated to the eastern eastward frame alignment circuit 32 through the first and the second eastward transmitters 26 and 27. At the eastern eastward frame alignment circuit 32, the eastward PCM signal is demultiplexed into the eastward output information signal A' which is a reproduction of the eastward input information signal A in the example being illustrated. The transmission overhead bits may be reproduced as reception overhead bits. A westward input information signal B of the information sources of the eastern group is likewise sent from the eastern westward transmitter 19 to the westward transmission route as a westward PCM signal, which is received by the western westward transmitter 18 as a westward output information signal B' for distribution to the information sinks of the western group.

Each of the western and the eastern line terminating equipments 11 and 12 comprises a loopback command signal producing circuit which will later be described with reference to the accompanying drawing. The loopback signal producing circuit is for producing a loopback command signal. In the manner which will presently be exemplified, the loopback command signal has a predetermined number of loopback command (signal) bits for each frame of the PCM signal. The loopback command bits produced in the western line terminating equipment 11, are for indicating the intermediate repeater and the eastern line terminating equipments 21, 22, and 12 which should or should not loop the eastward PCM signal back to the western line terminating equipment 11. When the western line terminating equipment 11 is receiving the westward PCM signal from the westward transmission route and is not, the eastward PCM signal is looped back as a part of the westward PCM signal and as the westward PCM signal per se, respectively. The loopback command bits produced in the eastern line terminating equipment 12, are similarly operable.

Each of the western eastward and the eastern westward frame alignment circuits 31 and 34 are for furthermore multiplexing the loopback command signal to the successive frames of the PCM signal. The loopback command bits of the predetermined number are placed in each frame of the PCM signal as predetermined ones of those of the transmission overhead bits which are not used in carrying the frame alignment signal and like data but remain as remaining or superfluous overhead bits.

It will later be described that each of the frame alignment circuits 32 and 33 of the receivers 17 and 18 and the frame alignment circuits 36 through 39 of the intermediate repeater equipments 21 and 22 additionally serves as a signal detector. Each of the receivers 17 and 18 and the receiver/transmitters 26 through 29 comprises a loopback carrying out device. More particularly, the signal detector of the eastern eastward frame alignment circuit 32 detects the loopback command bits which are included in the eastward PCM signal and are indicative of loopback of the eastward PCM signal at the eastern line terminating equipment 12 to the western line terminating equipment 11. The signal detector thereby produces a detection signal. Responsive to the detection signal, the loopback carrying out device of the eastern receiver 18 loops the eastward PCM signal back to the western line terminating equipment 11 as at least a part of the westward PCM signal. The signal detectors and the loopback carrying out device of the western line terminating and the inermediate repeater equipments 11, 21, and 22 are likewise operable. It is possible to understand for the time being that the loopback carrying out devices are depicted by dashed lines with arrowheads. A trouble, if any, is detected at the line terminating equipment 11 or 12 by comparing the PCM signal thereby produced with the PCM signal looped back thereto at a location which is indicated in the PCM communication network by the loopback command bits.

Figure 2:
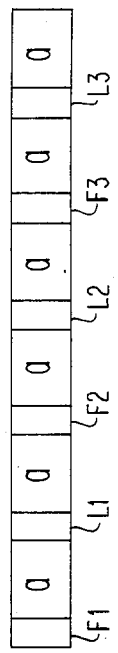
FIG. 2 shows an example of a frame of a PCM signal used in the PCM communication network depicted in FIG. 1.

Turning to FIG. 2, each frame of the eastward or the westward PCM signal is composed of the information bits indicated at a, first through third bits F1, F2, and F3 of the frame alignment signal, and first through third loopback command (signal) bits L1, L2, and L3. Each loopback command bit L (suffix omitted) has either of a binary one and a binary zero level, namely, is either of a mark and a space.

By way of example, the loopback command bits L1 through L3 are for indicating loopback of the PCM signal at the line terminating and the intermediate repeater equipments 11, 12, 21, and 22 as follows. When both of the second and the third bits L2 and L3 have the binary zero level, the eastward or the westward PCM signal should not be subjected to the loopback at all, namely, should be transmitted in an ordinary state or mode of communication. When both of the second and the third bits L2 and L3 are of the binary one level, each PCM signal should be looped back at the counterpart line terminating equipment. More specifically, the loopback should be carried out for the eastward PCM signal at the eastern line terminating equipment 12 and for the westward PCM signal at the western line terminating equipment 11.

According to the example being illustrated, a combination of the second bit L2 of the binary zero level and the third bit L3 of the binary one level indicates that each PCM signal should be looped back at the first intermediate repeater equipment 21. Another combination of the second bit L2 of the binary one level and the third bit L3 of the binary zero level indicates that each PCM signal should be looped back at the second intermediate repeater equipment 22. Let it now be surmised that both second and third bits L2 and L3 have neither the binary zero level nor the binary one level. When the first bit L1 is of the binary zero and the binary one levels, each PCM signal may be looped back at the western and the eastern line terminating equipments 11 and 12, respectively.

Figure 3:
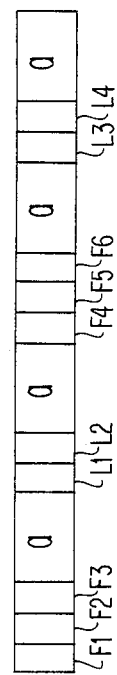
FIG. 3 shows another example of the PCM signal frame used in the network illustrated in FIG. 1.

Further turning to FIG. 3, each frame is composed of the information bits a, first through sixth bits F1, F2, . . . , and F6 of the frame alignment signal, and first through fourth loopback command bits L1, L2, L3, and L4. Six bits are used in each frame for the frame alignment signal in order to reduce occurrence of frame misalignment. This has no direct concern with this invention.

It is possible to use the four bits L1 through L4 in the manner exemplified in conjunction with FIG. 2. In this event, the loopback command signal has redundant information. This serves in reducing occurrence of bit or code errors in the loopback command signal and thereby in avoiding misoperation of the loopback. Alternatively, it is possible to further indicate the direction of loopback of each PCM signal in the manner which will later be exemplified.

Figure 4A:
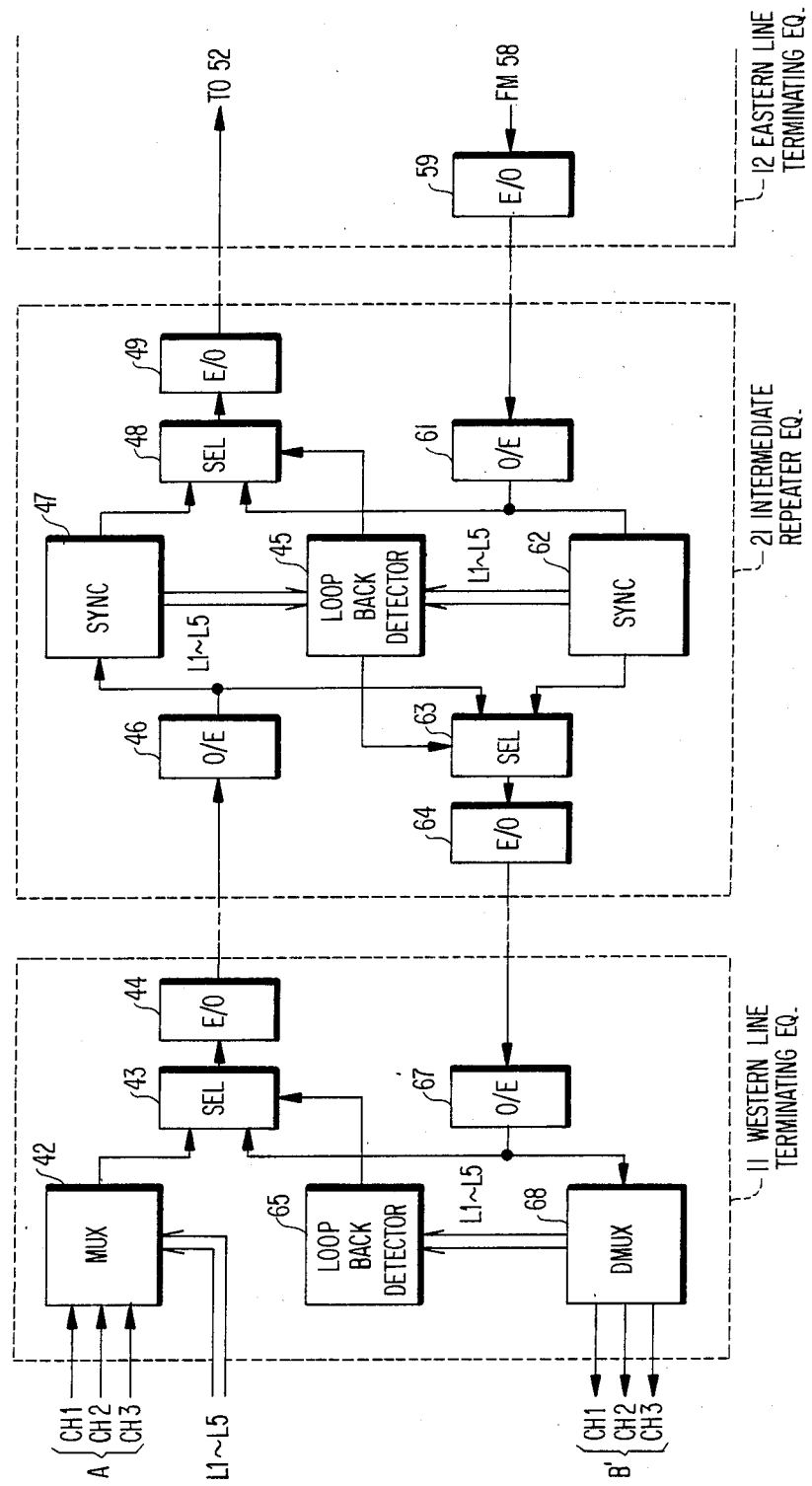
FIGS. 4 (a) and (b) show, when connected side by side, a block diagram of a PCM communication network comprising a loopback command system according to a second embodiment of this invention.
Figures 4B, 5A:
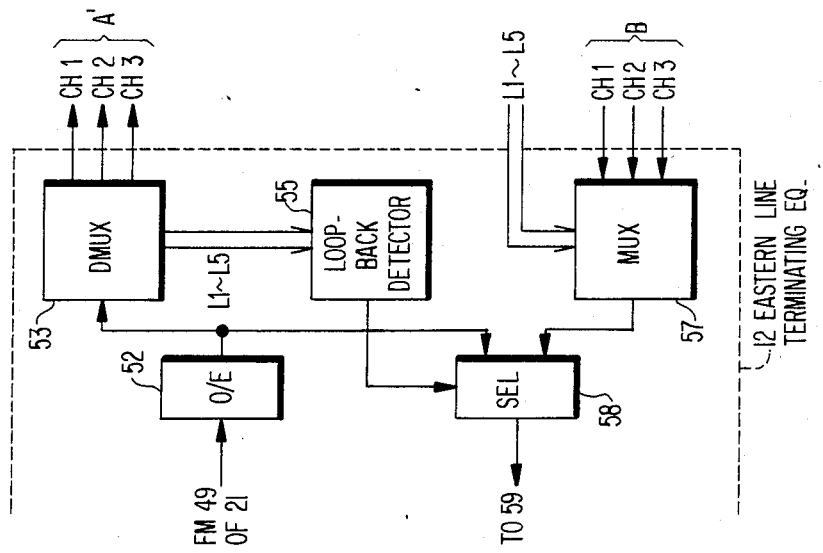
FIGS. 5 (a) and (b) collectively show a frame of a PCM signal used in the PCM communication network illustrated in FIGS. 4 (a) and (b)

Referring now to FIGS. 4 (a) and (b), another two-way PCM communication network will be described. The communication network is a 135-Mb/s optical PCM communication network and comprises a loopback command arrangement and a loopback command system according to a second embodiment of this invention. First or western and second or eastern line terminating equipments are designated by the reference numerals 11 and 12. Merely for simplicity of description, only one intermediate repeater equipment is depicted at 21.

In the western line terminating equipment 11, a western multiplexer or frame processor 42 is for multiplexing 45-Mb/s eastward input (electrical) information or message signals of first through third channels CH1, CH2, and CH3, frame alignment signals, a loopback command signal, and others into successive frames of a 135-Mb/s eastward terminal electrical (PCM) signal. The eastward input information signals may be asynchronous PCM signals of 44.736 Mb/s. In this event, the eastward terminal electrical signal may be of 139.264 Mb/s. The eastward input information signals collectively correspond to the eastward input information signal described in conjunction with FIG. 1 and will therefore be designated by the reference letter A. The loopback command signal is produced by a loopback command signal producing circuit. It is now possible to understand that the loopback command signal producing circuit is depicted by a double-line signal path which is drawn into the western line terminating equipment 11 and is labelled L1~L5.

In the ordinary state or mode of communication described in connection with FIG. 2, a western selector 43 selects the eastward terminal electrical signal in the manner which will become clear as the description proceeds. Supplied with the eastward terminal electrical signal from the western selector 43, a western E/O or electric-to-optic converter 44 produces an eastward terminal optical (PCM) signal which represents the eastward terminal electrical signal. The eastward terminal optical signal is transmitted towards the intermediate repeater equipment 21 through an eastward terminal optical fiber.

Figure 5B:
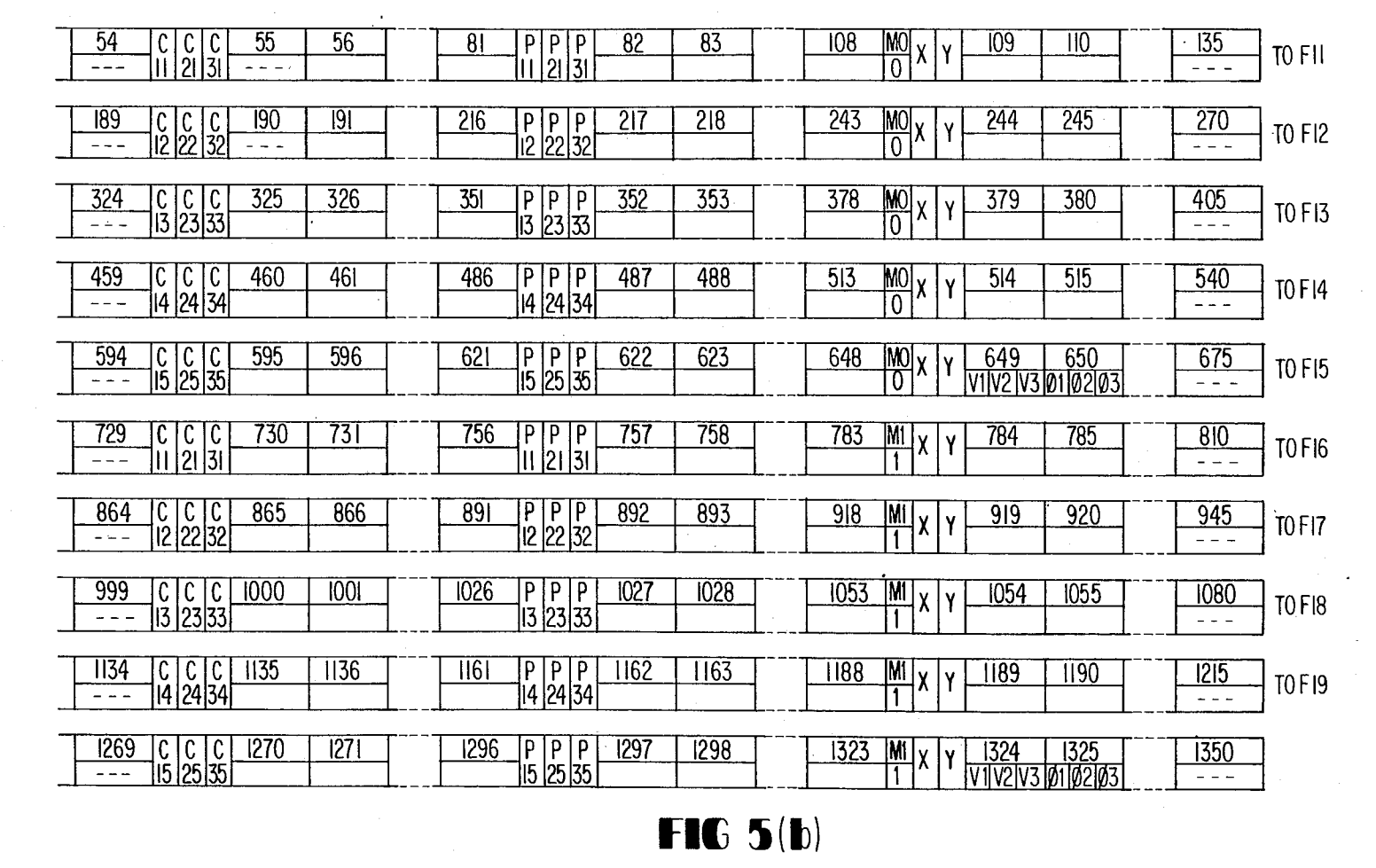

Turning to FIGS. 5 (a) and (b) for a short while, each frame of the electrical and the optical PCM signals may have a known format except for the loopback command signal. According to the format, three time slots are grouped into a time slot set. Merely for brevity of description, the time slot will be called a bit here and there.

The frame is composed of one thousand three hundred and fifty information bit sets and fifty overhead bit sets. The information bit sets are numbered from 1 to 1350. Each overhead bit set and twenty-seven information bit set, twenty-eight bit sets in total, are grouped into a subgroup. First through fifth subgroups are grouped into a bit group depicted along each of ten lines in the figure. The frame consists of first through tenth bit groups and is divisible into a former and a latter frame part, each consisting of five bit groups.

The loopback command signal has first through fifth loopback command (signal) bits L1, L2, L3, L4, and L5 for each of the former and the latter frame parts. The first through the fifth bits L1 to L5 are placed at the third time slots or as the third bits of the overhead bit sets which stand foremost in the second subgroup of the first through the fifth bit groups, respectively. The loopback command bits L1 through L5 are placed also at like time slots in the sixth through the tenth bit groups, respectively.

Among the first through the fifth loopback command bits L1 to L5, the first bit L1 may be used in indicating on or off the loopback. For example, the first bit L1 of the binary one and the binary zero levels is used to indicate that the loopback should be carried out and should not, respectively. The second bit L2 may be used in indicating the direction of loopback. The second bit L2 of the binary one level is used to indicate, for instance, that the eastward signal should be looped back westwards. In this instance, the second bit L2 of the binary zero level indicates eastward loopback of the westward signal.

The third through the fifth bits L3 to L5 may be used in indicating loopback addresses. All binary zero bits L3 through L5 may indicate the western line terminating equipment 11. All binary one bits L3 to L5 may indicate the eastern line terminating equipment 12. When only the third bit L3 has the logic one level under the circumstances, the loopback address specifies the intermediate repeater equipment, such as 21, which is nearest to the western line terminating equipment 11. It is possible in this manner to indicate up to six intermediate repeater equipments.

Except for the 649-th and the 1324-th information bit sets, each information bit set is used for first through third information bits $\phi1$, $\phi2$, and $\phi3$. The first information bits $\phi1$ of the successive frames carry the input information signal of the first channel CH1. The second and the third information bits $\phi2$ and $\phi3$ likewise carry the input information signals of the second and the third channels CH2 and CH3.

The 649-th and the 1324-th information bit sets are used in carrying out stuffing which is known in the art. More particularly, stuffs may or may not be used instead of the information bits $\phi1$ through $\phi3$ at stuff time slots V1, V2, and V3 which are preassigned in each of the 649-th and the 1324-th information bit sets to the first through the third channels CH1 to CH3, respectively.

The stuffing is carried out in order that the bit rate and the phase of the 139.264-Mb/s signal may not be disturbed by possible fluctuations in the bit rate and/or the phase of the asynchronous PCM signals. Five stuff or stuffing indicator bits Ci1 through Ci5 are used for each channel CHi collectively as a stuff indicator word. The stuff indicator words for the respective channels CH1 through CH3 are placed in the overhead bit sets which appear first in the third subgroups of each of the former and the latter frame parts. When the stuffing is done and not, each stuff indicator word may have all binary one and zero stuff indicator bits Ci1 to Ci5.

For each channel CHi, first through fifth known parity bits Pi1 to Pi5 are placed in the overhead bit sets which stand foremost in the fourth subgroups of each of the former and the latter frame parts. Each parity bit is calculated as regards one hundred and thirty-five information bits in each bit group.

The overhead bit sets which occur first in the first through the tenth bit groups, are used for frame alignment bits of zeroth through tenth frame alignment patterns F10, F11, . . . , and F19. A zeroth multiframe alignment signal M0 has bits placed at first time slots or as the first bits of the fifth subgroups of the respective bit groups of the former frame part. A first multiframe alignment signal M1 has bits at similar time slots of the latter frame part.

In the overhead bit sets of the fifth subgroup of each bit group, X and Y bits are frame identifier bits. The X and the Y bits are used in indicating in which frame the illustrated frame is present when like frames are further multiplexed either into a twice or a four times as high bit rate signal as the 135-Mb/s signal. The zeroth and the first multiframe alignment (signal) bits M0 and M1 are similar to the frame identifier bits.

In the second subgroup of each of the former and the latter frame parts, overhead bits D1 through D10 are extra use digits. The extra use digits D1 through D10 may be used in carrying an orderwire signal, a supervisory signal, and like auxiliary data.

Turning back to FIGS. 4 (a) and (b), the intermediate repeater equipment 21 comprises a repeater loopback command signal detector 45 which will become clear as the description proceeds. The eastward terminal optical signal reaches the intermediate repeater equipment 21 with attenuation and possible fluctuation of timing between the information bits and/or the overhead bits. An eastward O/E or optic-to-electric converter 46 converts the eastward terminal optical signal to a regenerated eastward repeater (electrical) signal. Levels and timing are corrected in the regenerated eastward repeater signal in the manner known in the art. An eastward synchronizer 47 restores frame alignment in the regenerated eastward repeater signal and delivers a frame aligned eastward (electrical) signal to an eastward selector 48. In the meantime, the eastward synchronizer 47 separates the loopback command bits L1 through L5 from each frame of the frame aligned eastward signal as separated eastward bits for supply to the repeater loopback command signal detector 45.

It may be mentioned here that the frame alignment is kept by the eastward synchronizer 47 or like devices in the known manner. To speak a little more in detail, detection is carried out for the frame alignment patterns F10 through F19 and the multiframe alignment bits M0 and M1 of a plurality of consecutive frames. Frame misalignment is detected in the case of failure of the detection during a plurality of successive frames. In this case, the synchronizer 47 or its equivalent begins to search the frame afresh.

It will also become clear as the description proceeds that the repeater loopback command signal detector 45 delivers an eastward loopback control signal to the eastward selector 48. In the ordinary state of communication, the eastward loopback control signal makes the eastward selector 48 select the frame aligned eastward signal as an eastward repeater electrical (PCM) signal. An eastward E/O converter 49 converts the eastward repeater electrical signal to an eastward repeater optical (PCM) signal representative of the frame aligned eastward signal. The eastward repeater optical signal is propagated towards the eastern line terminating equipment 12 through an eastward repeater optical fiber. The eastward terminal and repeater optical fibers serve either collectively or individually as an eastward transmission route.

In the eastern line terminating equipment 11, an eastern O/E converter 52 converts the eastward repeater optical signal to a regenerated eastward terminal (electrical) signal for supply to an eastern demultiplexer or signal processor 53. The regenerated eastward terminal signal is subjected to frame alignment and is demultiplexed into 45-Mb/s eastward output (electrical) information signals of the first through the third channels CH1 to CH3. The eastward output information signals are reproductions of the eastward input information signals of the respective channels CH1 through CH3 and are collectively designated by the reference letter A'.

Meanwhile, the eastern demultiplexer 53 separates the loopback command bits L1 through L5 from each frame of the regenerated eastward terminal signal as separated eastern bits. An eastern loopback command signal detector 55 produces an eastern loopback control signal in accordance with a bit pattern which the separated eastern bits have. Incidentally, destuffing is carried out by the eastern demultiplexer 53 with reference to the stuff indicator bits Ci1 through Ci5. Five bits are used for each stuff in order to make the eastern demultiplexer 53 or its equivalent correctly carry out the destuffing by majority decision even in the presence of a bit error in each stuff indicator word.

Like in the western line terminating equipment 11, an eastern multiplexer or signal processor 57 multiplexes 45-Mb/s westward input information signals of three channels CH1 through CH3, frame alignment signals, a loopback command signal, and so forth into successive frames of a 135-Mb/s westward terminal electrical signal. The westward input information signals are collectively indicated at B. An eastern selector 58 is controlled by the eastern loopback control signal and is supplied with the westward terminal electrical signal and the regenerated eastward terminal signal.

The ordinary state of communication is indicated by the separated eastern bits of a bit pattern other than 11111. Under the circumstances, the eastern loopback control signal makes the eastern selector 58 select the westward terminal electrical signal for delivery to an eastern E/O converter 59. A westward terminal optical signal is delivered towards the intermediate repeater equipment 21. The westward terminal optical signal represents the westward terminal electrical signal.

The separated eastern bits of the bit pattern of 11111 indicate that the eastward PCM signal should be looped back to the western line terminating equipment 11 at the eastern line terminating equipment 12. In this event, the eastern loopback control signal makes the eastern selector 58 select the regenerated eastward terminal signal. The westward terminal optical signal represents the regenerated eastward terminal signal. It is now understood that a combination of the eastern selector 58 and a signal path between the eastern O/E converter 52 and the eastern selector 58 serves as a loopback carrying out device of the eastern line terminating equipment 12.

The intermediate repeater equipment 21 comprises a westward O/E converter 61, a westward synchronizer 62, a westward selector 63, and a westward E/O converter 64 which correspond to the circuit elements 46 to 49, respectively. The afore-mentioned eastward loopback control signal is produced by the repeater loopback command signal detector 45 in response to the loopback command bits L1 to L5 which are separated by the westward synchronizer 62 as separated westward bits from each frame of a regenerated westward repeater signal produced by the westward O/E converter 61. Likewise, the repeater loopback command signal detector 45 delivers a westward loopback control signal to the westwerd selector 63 in response to the separated eastward bits.

According to the example described in conjunction with FIGS. 5 (a) and (b), the loopback command signal indicates the normal state of communication either when the first bit L1 of the separated eastward and westward bits has the binary zero level or when the third through the fifth bits L3 to L5 have a bit pattern which is not 100. In either event, the eastward and the westward PCM signals should not be looped back at the intermediate repeater equipment 21 but be transmmitted through the eastward and the westward transmission routes, respectively.

Only when the first bit L1 has the binary one level and furthermore when the third through the fifth bits L3 to L5 have a bit pattern of 100, the loopback command signal indicates the loopback at the intermediate repeater equipment 21. When the second bit L2 has the binary zero level under the circumstances, the eastward loopback control signal makes the eastward selector 48 select the regenerated westward repeater signal to make the eastward repeater optical signal represent the same. When the second bit L2 is of the binary one level, the westward loopback control signal makes the westward selector 63 select the regenerated eastward repeater signal. The westward E/O converter 64 delivers a westward repeater optical (PCM) signal towards the western line terminating equipment 11 with the westward repeater optical signal made to represent the regenerated eastward repeater signal.

It is now understood that a combination of the eastward selector 48 and a signal path between the westward O/E converter 61 and the eastward selector 48 serves as a loopback carrying out device of the intermediate repeater equipment 21 for the westward PCM signal. Another combination of the westward selector 63 and a signal path between the eastward O/E converter 46 and that selector 63 serves as a loopback carrying out device which the intermediate repeater equipment 21 comprises for the eastward PCM signal.

The western line terminating equipment 11 comprises a western loopback command signal detector 65, a western O/E converter 67, and a western demultiplexer 68 in correspondence to the circuit elements 55, 52, and 53, respectively. The western demultiplexer 68 produces 45-Mb/s westward output information signals which are collectively indicated at B'. The western demultiplexer 68 furthermore supplies the western loopback command signal detector 65 with separated western bits which are separated from a regenerated westward terminal signal produced by the western O/E converter 67. Responsive to the separated western bits, the western loopback command signal detector 65 delivers a western loopback control signal to the western selector 43.

Unless the separated western bits have a bit pattern of 10000, the western loopback control signal indicates the normal state of communication. Loopback should not be carried out at the western line terminating equipment 11. The eastward terminal optical signal represents the eastward terminal electrical signal in the manner described before.

Only when the separated western bits have the bit pattern of 10000, the separated western bits indicate that the westward repeater optical signal should be looped back eastwards towards the eastern line terminating equipment 12. In this event, the western loopback control signal makes the western selector 43 select the regenerated westward terminal signal. The eastward terminal optical signal is made to represent the regenerated westward terminal signal. It will now be appreciated that a combination of the western selector 43 and a signal path between the western O/E converter 67 and the selector 43 serves as a loopback carrying out device of the western line terminating equipment 11.

It may be worthwhile here to direct attention to the loopback command signal detectors 45, 55, and 65. It is preferred that each signal detector should repeatedly detect the loopback command bits L1 through L5 which are separated from a plurality of consecutive frames by a pertinent one of the demultiplexers 53 and 68 and the synchronizers 47 and 62. This operation of the signal detector is similar to the detection carried out for the frame alignment patterns F10 through F19 and the multiframe alignment bits M0 and M1 by the synchronizers 47 and 62 and the demultiplexers 53 and 68.

Figure 6A:
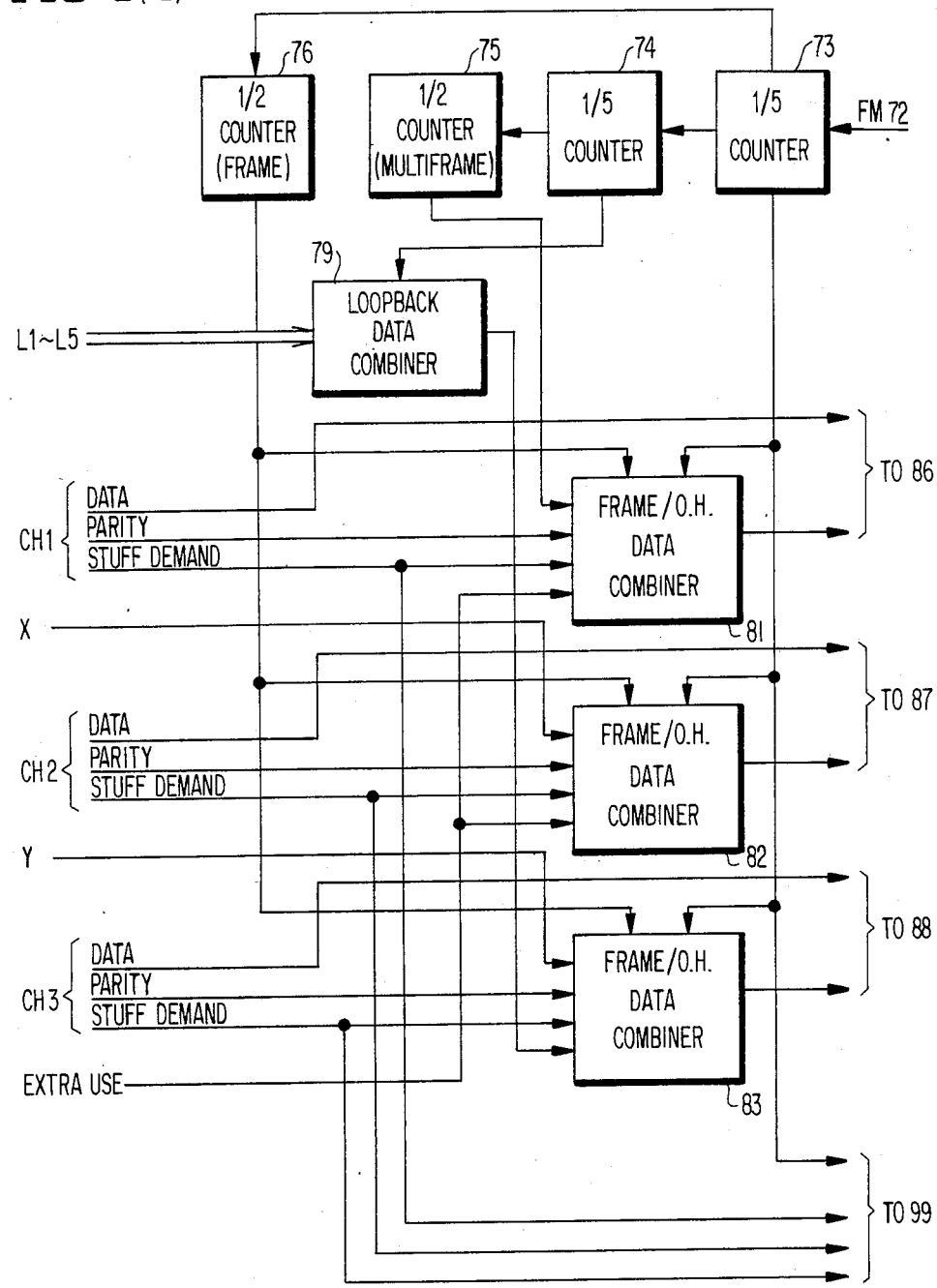
FIGS. 6 (a) and (b) show in combination a block diagram of a multiplexer which may be used in a line terminating equipment of the network depicted in FIGS. 4 (a) and (b)
Figure 6B:
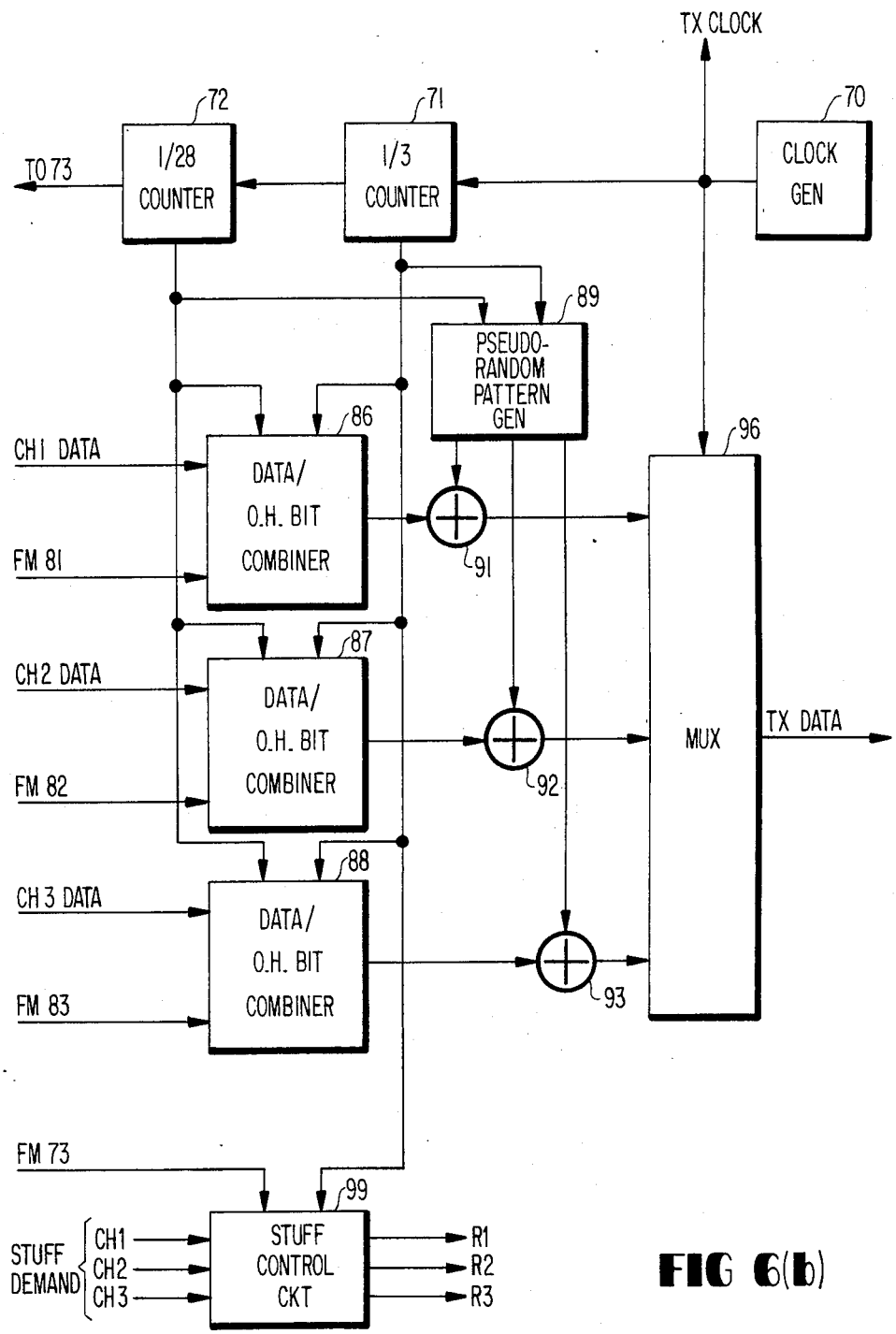

Referring now to FIGS. 6 (a) and (b), a multiplexer will briefly be described. The multiplexer being illustrated, is for use in either of the western and the eastern line terminating equipment 11 and 12 described in conjunction with FIGS. 4 (a) and (b) and is for use in producing a 139.264-Mb/s multiplexed signal as a transmitter data signal TX DATA. The multiplexer is of known circuitry except for those parts thereof which are related to the loopback command signal.

A succession of the loopback command (signal) bits L1 through L5 is repeatedly produced as a serial datum of a low bit rate of 139264/[3(135+5)] or 331.581 kb/s and is delivered to the multiplexer. The input information signals are indicated by DATA for the first through the third channels CH1 to CH3. Parity data are designated by PARITY. The parity bits Pi1 through Pi5 are derived from the parity data. It will be presumed that the stuffing is already carried out of each channel by the use of a first-in first-out buffer memory (not shown) in the known manner. The input information signal of each channel therefore has a bit rate of 44.7634 Mb/s. Stuff demand data STUFF DEMAND are for use in indicating whether or not the stuffing is actually done for each channel. Frame identifier data are depicted at X and Y by using the reference letters indicative of the frame identifier bits. A sequence of extra use digits EXTRA USE is of another low bit rate of 663.162 kb/s. The loopback command bits of the low bit rate, the parity data, the stuff demand data, the frame identifier data, and the extra use digits are used as transmission overhead data.

A clock generator 70 is for generating a fundamental clock sequence of a highly precise and stable fundamental frequency of 139.264 MHz. The clock generator 70 may comprise a crystal oscillator. A first counter 71 is a ⅓ counter for producing three timing clock sequences in response to the fundamental clock sequence. The three timing clock sequences will collectively be called a first clock sequence, which is used in timing the respective time slots in each bit set of the information and the overhead bit sets.

Responsive to one of the three timing clock sequences, a second counter 72 produces a second clock sequence consisting of twenty-eight timing clock sequences which are for use in timing the twenty-eight bit sets in each subgroup. Supplied with one of the twenty-eight timing clock sequences, a third counter 73 produces a third clock sequence which times the first through the fifth subgroups in each bit group. Responsive to one of five timing clock sequences of the third clock sequence, a fourth counter 74 produces a fourth clock sequence for use in timing the second subgroups in the first through the fifth or the sixth through the tenth bit groups.

Responsive to another clock sequence produced by the fourth counter 74 to specify the fifth subgroups in the first through the fifth or the sixth through the tenth bit groups, a fifth counter 75 produces a fifth clock sequence indicative of the former and the latter frame parts. The fifth clock sequence provides the zeroth and the first multiframe alignment signals M0 and M1. Supplied with one of the twenty-eight timing clock sequences, a sixth counter 76 produces a sixth clock sequence which specifies the first subgroups in the odd-numbered and the even-numbered bit groups. The sixth clock sequence provides the frame alignment bit patterns.

Controlled by the fourth clock sequence, a loopback data combiner 79 places the loopback command bits L1 through L5 of the low bit rate in the second subgroups of the first through the fifth or the sixth through the tenth bit groups, respectively, to produce a loopback command data stream. Controlled by the third clock sequence, a first frame and overhead (O. H.) data combiner 81 places the frame alignment bit patterns in the first subgroups of the odd-numbered and the even-numbered bit groups, the multiframe alignment signals M0 and M1 as multiframe alignment data in the fifth subgroups of the former and the latter frame parts, the parity data of the first channel CH1 in the fourth subgroups of each bit group, the stuff demand data of the first channel CH1 in the third subgroups of each bit group, and alternating ones of the extra use digits in the first subgroup of each bit group. The first frame and overhead data combiner 81 thereby produces a first overhead data stream. Similarly, a second frame and overhead data combiner 82 combines the frame alignment bit patterns, the frame identifier data X in place of the multiframe alignment data, the parity and the stuff demand data of the second channel CH2, and remaining ones of the extra use digits to produce a second overhead data stream. A third frame and overhead data combiner 83 is for likewise combining the frame alignment bit patterns, the frame identifier data Y, the parity and the stuff demand data of the third channel CH3, and the loopback command data stream instead of the alternating and the remaining ones of the extra use digits into a third overhead data stream.

Controlled by the first and the second clock sequences, a first data and overhead (O. H.) bit combiner 86 places the input information signal DATA of the first channel CH1 as information bits in the first time slots of the respective information bit sets and the first overhead data stream as overhead bits in the first time slots of the overhead bit sets of those of the subgroups in which the overhead data are placed in the first overhead data stream. The first data and overhead bit combiner 86 thereby produces a first bit stream. Likewise, a second data and overhead bit combiner 87 arranges the input information signal DATA of the second channel CH2 and the second overhead data stream as information and overhead bits in the second time slots of the information and the overhead bit sets, respectively, to produce a second bit stream. A third data and overhead bit combiner 88 likewise combines the third channel input information signal CH3 DATA and the third overhead data stream into a third bit stream.

Supplied with the first and the second clock sequences, a known pseudo-random pattern generator 89 produces first through third pseudo-random pattern sequences in synchronism with the first through the third time slots of the transmitter data signal TX DATA, respectively. A first Exclusive OR gate 91 is for randomizing the first bit stream by the first pseudo-random pattern sequence and produces a first random stream. Similarly, a second Exclusive OR gate 92 and a third Exclusive OR gate 93 are used in producing a second and a third random stream, respectively.

Controlled by the fundamental clock sequence, an output multiplexer 96 multiplexes the first through the third random streams into the transmitter data signal TX DATA. The fundamental clock sequence is delivered as a transmitter clock sequence TX CLOCK to the demultiplexer, such as 53 or 68, used in the line terminating equipment which comprises the illustrated multiplexer. Alternatively, the transmitter clock sequence TX CLOCK may be sent to the intermediate repeater and the counterpart line terminating equipments through the transmission route. Incidentally, a stuff control circuit 99 is supplied with the first and the third clock sequences and the stuff demand data of the first through the third channels CH1 to CH3 and produces first through third control clock sequences R1, R2, and R3 which are used in temporarily stopping read clocks in the known manner.

Reviewing FIGS. 6 (*a*) and (*b*), it is possible to understand that the multiplexer comprises a signal multiplexing circuit for multiplexing the loopback command signal in the successive frames of the transmission data signal TX DATA. The signal multiplexing circuit comrpises the loopback command data combiner 79 and the fifth counter 75 and makes other parts of the multiplexer place the loopback command (signal) bits L1 through L5 in each frame of the transmission data signal TX DATA as predetermined ones of the overhead bits.

Figure 7A:
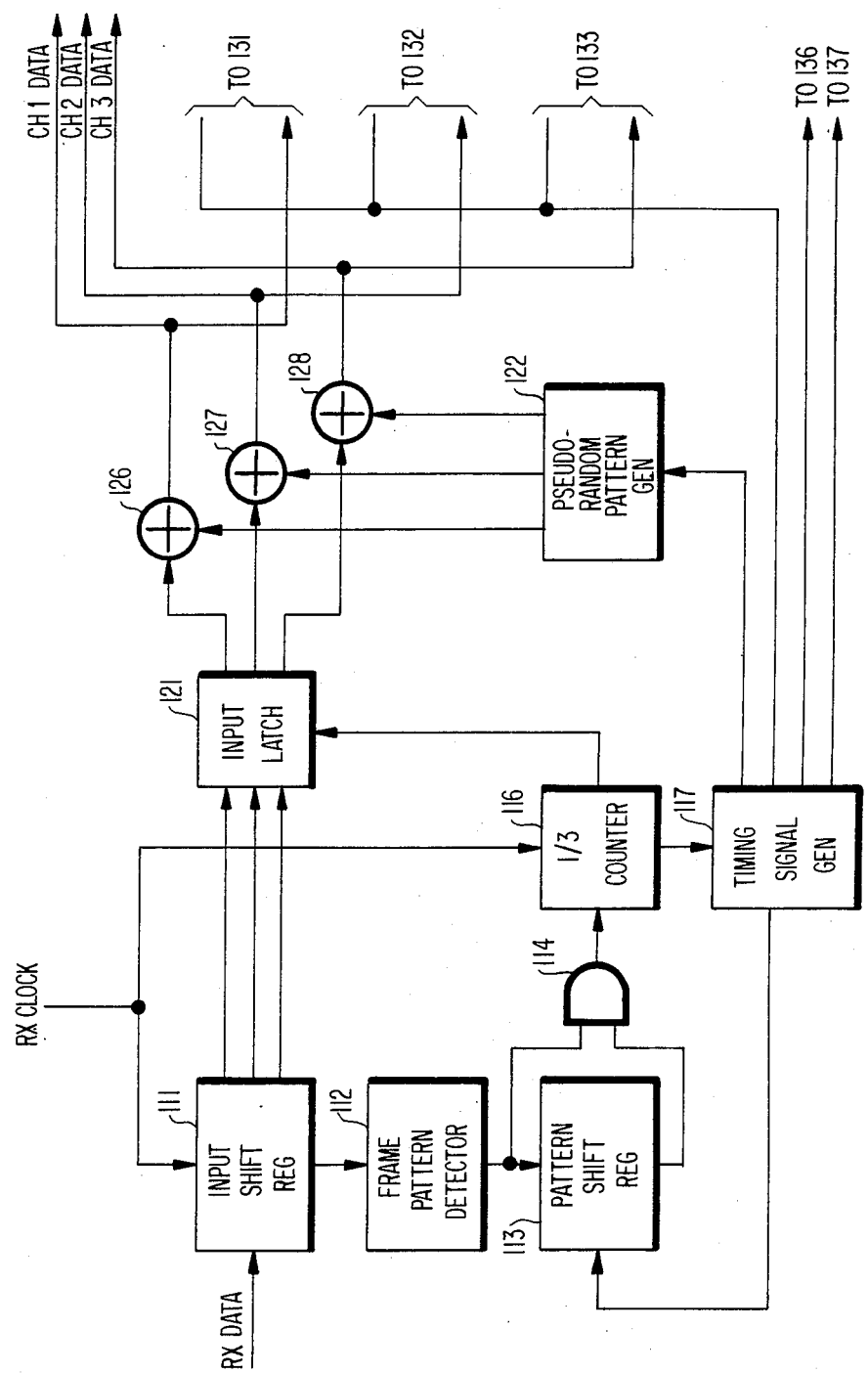
FIGS. 7 (a) and (b) likewise show a block diagram of a demultiplexer which may be used in the line terminating equipment mentioned in conjunction with FIGS. 6 (a) and (b)
Figure 7B:
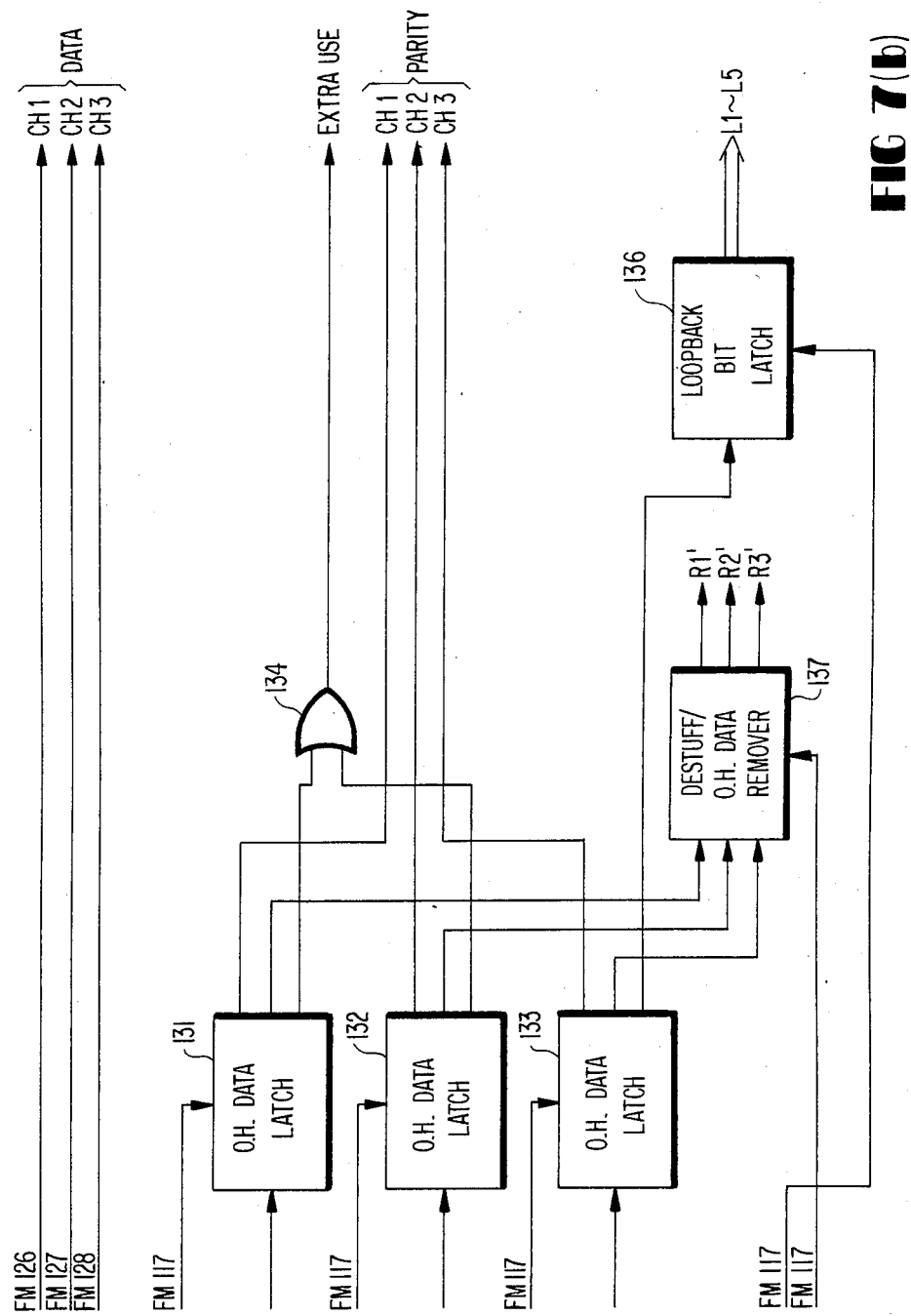

Referring to FIGS. 7 (*a*) and (*b*), a demultiplexer will briefly be described. The demultiplexer is for use in demultiplexing the 139.264-Mb/s multiplex signal which is transmitted from a counterpart line terminating equipment and is received as a receiver data signal RX DATA. The transmitter clock sequence TX CLOCK (FIG. 6 (*b*)) is delivered to the demultiplexer as a receiver clock sequence RX CLOCK either directly from the multiplexer of the same line terminating equipment 11 or 12 or through the transmission route from the counterpart line terminating equipment. The demultiplexer is of known circuitry except for those parts thereof which deal with the loopback command signal.

The demultiplexer comprises an input shift register 111 responsive to the receiver clock sequence RX CLOCK for shifting the receive data signal RX DATA bit by bit to produce a shifted multiplex signal and three demultiplexed sequences. Responsive to the shifted multiplex signal, a frame pattern detector or checking circuit 112 detects the frame alignment patterns to produce a pattern detection signal. Controlled by a shift pulse sequence which will presently be described, a pattern shift register 113 produces a pattern count signal when the frame alignment patterns are repeatedly detected from a predetermined number of consecutive frames. Enabled by the pattern count signal, and AND gate 114 produces a counter control signal which is timed by the pattern detection signal.

Controlled by the counter control signal, a counter 116 produces a channel timing clock sequence. Supplied with one of three timing clock sequences of the channel timing clock sequence, a timing signal generator 117 delivers the shift pulse sequence to the pattern shift register 113 and produces first through fourth demultiplexer timing signals. It will shortly become clear that the first through the fourth demultiplexer timing signals are equivalents of the first through the sixth clock sequences described in connection with FIGS. 6 (*a*) and (*b*) although simplified to a certain extent.

The channel timing clock sequence is delivered to an input latch circuit 121 to make the same rearrange the three demultiplexed sequences into first through third demultiplexer random streams which correspond to the first through the third random streams produced in the counterpart line terminating equipment, respectively. Responsive to the first demultiplexer timing signal, a pseudo-random pattern generator 122 produces first through third pseudo-random pattern sequences corresponding to the sequences which are used in the counterpart line terminating equipment and are similarly named. Supplied with the first pseudo-random pattern sequence from the pseudo-random pattern generator 122, a first Exclusive OR gate 126 converts the first demultiplexer random stream to a first demultiplexer bit stream. Second and third Exclusive OR gates 127 and 128 likewise produce a second and a third demultiplexer bit stream, respectively. The first through the third demultiplexer bit streams correspond to the first through the third bit streams of the counterpart line terminating equipment, respectively, and comprise reproductions of the input information signals DATA of the first through the third channels CH1 to CH3 and reproductions of the transmission overhead data. Stuffs placed at the time slots V1 through V3 (FIG. 5 (*b*)) are also included in the first through the third demultiplexer bit streams.

Controlled by the second demultiplexer timing signal, a first overhead (O. H.) data latch circuit 131 deals with the first demultiplexer bit stream to reproduce the parity data PARITY of the first channel CH1, the first channel stuff demand data, and those of the extra use digits which are combined with the first channel input information signal. Similarly, a second overhead data latch circuit 132 reproduces the second channel parity data CH2 PARITY, the second channel stuff demand data, and those of the extra use digits which are combined with the second channel input information signal. A third overhead data latch circuit 133 reproduces the third channel parity data CH3 PARITY, the third channel stuff demand data, and the loopback command data stream. Reproductions of the extra use digits EXTRA USE are produced by an OR gate 134 in response to the extra use data supplied from the first and the second overhead data latch circuits 131 and 132.

Controlled by the third demultiplexer timing signal, a loopback bit latch circuit 136 deals with the loopback command data stream reproduced by the third overhead data latch circuit 133. The loopback bit latch circuit 136 thereby reproduces the loopback command (signal) bits L1 through L5 of the low bit rate as the separated eastern or western bits described in connection with FIGS. 4 (*a*) and (*b*). Responsive to the second demultiplexer timing signal and reproductions of the first through the third channel stuff demand data, a destuff and overhead data remover 137 produces first through third read clocks R1', R2', and R3' for use in reading only the reproductions of the first through the third channel input information signals in the known manner from the first through the third demultiplexer bit streams, destuffing the stuffs included therein.

Finally referring to FIG. 8, a synchronizer is for use as either of the eastward and the westward synchronizers 47 and 62 (FIG. 4 (*a*)) and is of known circuitry except for those parts thereof which deal with the loopback command signal. It will be assumed merely for convenience of description that the transmitter data signal TX DATA and the transmitter clock sequence TX CLOCK are delivered to the synchronizer as a receiver data signal RX DATA and a receiver clock sequence RX CLOCK and then delivered therefrom again as a transmitter data signal TX DATA and a transmitter clock sequence RX CLOCK as they stand.

The synchronizer comprises an input shift register 141, a frame pattern detector 142, a pattern shift register 143, and AND gate 144, a counter 146, a timing signal generator 147, an input latch circuit 151, an overhead (O. H.) gate latch circuit 153, and a loopback bit latch circuit 156 which are counterparts of the circuit elements 111 through 114, 116, 117, 121, 133, and 136 described in conjunction with FIGS. 7 (a) and (b). The loopback bit latch circuit 156 reproduces the loopback command bits L1 through L5 of the low bit rate as the separated eastward or westward bits.

While this invention has thus far been described in specific conjunction with two embodiments thereof and a few examples of the loopback command signal, it will now readily possible for one skilled in the art to make and use this invention and to develop various modifications. For example, it is preferred in the manner outlined heretobefore that each of the loopback command signal detectors 45, 55, and 65 should comprise a pattern detector, a pattern shift register for producing the loopback control signal like the demultiplexer and the synchronizer illustrated with reference to FIGS. 7 (a) and (b) and FIG. 8. If more than eight loopback addresses should be indicated by a set of three bits of the loopback command (signal) bits L1 through L5 described in connection with FIGS. 5 (a) and (b), it is possible to indicate the loopback addresses by a combination of three-bit sets in two or more consecutive frames. Even in this event, each loopback command signal detector can be composed of a large-scale IC which is available at a low price because the loopback command bits L1 to L5 are of a low bit rate exemplified above. It is possible to understand that the loopback command bits L1 through L5 of the respective three-bit sets are placed in the respective frames of the eastward or the westward PCM signal.

What is claimed is:

1. A loopback command arrangement for use in a first line terminating station of a pulse code modulation communication network comprising a first and a second transmission route and at least one intermediate repeater station and a second line terminating station along said first and said second transmission routes, said first line terminating station including frame processing means for multiplexing input signals and transmission overhead bits into successive frames of a first pulse code modulated signal for delivery to said first transmission route and for demultiplexing successive frames of a second pulse code modulated signal received from said second transmission route into output signals and reception overhead bits, wherein the improvement comprises:

signal producing means coupled to said first line terminating station for producing a loopback command signal having a predetermined number of loopback command signal bits for each frame of said first pulse code modulated signal to indicate said at least one intermediate repeater station which should loop back said first pulse code modulated signal as at least a part of said second pulse code modulated signal and said second line terminating station which should not loop back said first pulse code modulated signal; and signal multiplexing means for making said frame processing means multiplex said loopback command signal in the successive frames of said first pulse code modulated signal with said loopback command signal bits placed in each frame of said first pulse code modulated signal as predetermined ones of the transmission overhead bits.

2. A loopback command arrangement as claimed in claim 1, said second line terminating station being for muiltiplexing loopback command signal bits in each frame of said second pulse code modulated signal to indicate said at least one intermediate repeater station which should loop back said second pulse code modulated signal as at least a part of said first pulse code modulated signal and said first line terminating station which should not loop back said second pulse code modulated signal, wherein said first line terminating station further comprises:

signal detecting means responsive to said reception overhead bits for detecting the loopback command bits indicative of loopback of said second pulse code modulated signal at said first line terminating station to produce a loopback control signal; and loopback means responsive to said loopback control signal for looping back said second pulse code modulated signal as said at least a part of the first pulse code modulated signal.

3. A loopback command arrangement for use in each of at least one intermediate repeater station of a pulse code modulation communication network comprising a first and a second line terminating station and a first and second transmission route connecting said first and said second line terminating stations through said at least one intermediate repeater station, said first line terminating station comprising frame processing means for multiplexing input signals and transmission overhead bits into successive frames of a first pulse code modulated signal for delivery to said first transmission route with a predetermined number of loopback command signal bits of a loopback command signal placed in each frame of said first pulse code modulated signal as predetermined ones of the transmission overhead bits and for demultiplexing successive frames of a second pulse code modulated signal received from said second transmission route into output signals and reception overhead bits, said loopback command signal bits being indicative of said at least one intermediate repeater station which should loop back said first pulse code modulated signal as at least a part of said second pulse code modulated signal and said second line terminating station which should not loop back said first pulse code modulated signal, wherein the improvement comprises:

signal detecting means coupled to said at least one intermediate repeater station and responsive to the successive frames of said first pulse code modulated signal for detecting the loopback command signal bits indicative of loopback of said first pulse code modulated signal at said each of the at least one intermediate repeater station to produce a loopback control signal; and loopback means responsive to said loopback control signal for looping back said first pulse code modulated signal as said at least a part of the second pulse code modulated signal.

4. In a loopback command system for use in a pulse code modulation communication network comprising a first and a second transmission route and a first line terminating station, at least one intermediate repeater station, and a second line terminating station along said first and said second transmission routes, said first line terminating station including frame processing means for multiplexing input signals and transmission overhead bits into successive frames of a first pulse code modulated signal for delivery to said first transmission route and for demultiplexing successive frames of a second pulse code modulated signal received from said second transmission route into output signals and reception overhead bits, the improvement wherein:

said first line terminating station comprises:

signal producing means for producing a loopback command signal having a predetermined number of loopback command signal bits for each frame of said first pulse code modulated signal to indicate said at least one intermediate repeater station which should loop back said first pulse code modulated signal as at least a part of said second pulse code modulated signal and said second line terminating station which should not loop back said first pulse code modulated signal, and signal multiplexing means for making said frame processing means multiplex said loopback command signal in the successive frames of said first pulse code modulated signal with said loopback command signal bits placed in each frame of said first pulse code modulated signal as predetermined ones of said transmission overhead bits;

each of said at least one intermediate repeater stations comprising:

signal detecting means responsive to the successive frames of said first pulse code modulated signal for detecting the loopback command signal bits indicative of loopback of said first pulse code modulated signal at said each of the at least one intermediate repeater station to produce a loopback control signal; and loopback means responsive to said loopback control signal for looping back said first pulse code modulated signal as said at least a part of the second pulse code modulated signal.

5. A loopback command system as claimed in claim 4, said second line terminating station being for multiplexing loopback command signal bits in each frame of said second pulse code modulated signal to indicate said at least one intermediate repeater station which should loop back said second pulse code modulated signal as at least a part of said first pulse code modulated signal and said first line terminating station which should not loop back said second pulse code modulated signal, wherein said first line terminating station further comprises:

signal detecting means responsive to said reception overhead bits for detecting the loopback command signal bits indicative of loopback of said second pulse code modulated signal at said first line terminating station to produce a terminal loopback control signal; and loopback means responsive to said terminal loopback control signal for looping back said second pulse code modulated signal as said at least a part of the first pulse code modulated signal.

* * * * *

UNITED STATES PATENT AND TRADEMARK OFFICE
CERTIFICATE OF CORRECTION

PATENT NO. : 4,686,668

DATED : August 11, 1987

INVENTOR(S) : TOSHIKAZU KOSEKI & SHIGEAKI SAITO both of Tokyo Japan

It is certified that error appears in the above-identified patent and that said Letters Patent is hereby corrected as shown below:

IN THE PRIORITY - change "57-90126" to --59-90126--.

Column 2, line 49, change "not" to --and--;

Column 5, line 15, change "16, 27, 26 and 17" to --16, 26, 27 and 17--

Column 6, line 64, change "inermediate" to --intermediate--;

Column 17, line 7, change "gate" to --data--.

Signed and Sealed this

Twenty-fourth Day of May, 1988

*Attest:*

DONALD J. QUIGG

*Attesting Officer*  *Commissioner of Patents and Trademarks*